April 29, 1952 G. ELLIOTT 2,595,062

TELEPHONE CONVERSATION TIMING MEANS

Filed Dec. 12, 1949

INVENTOR.
GEORGE ELLIOTT
BY
T. L. Bowes
ATTORNEY

Patented Apr. 29, 1952 2,595,062

UNITED STATES PATENT OFFICE 2,595,062

TELEPHONE CONVERSATION TIMING MEANS

George Elliott, Rochester, N. Y., assignor to Stromberg-Carlson Company, a corporation of New York Application December 12, 1949, Serial No. 132,618

10 Claims. (Cl. 179—7.1)

Figures 1, 2, 3:
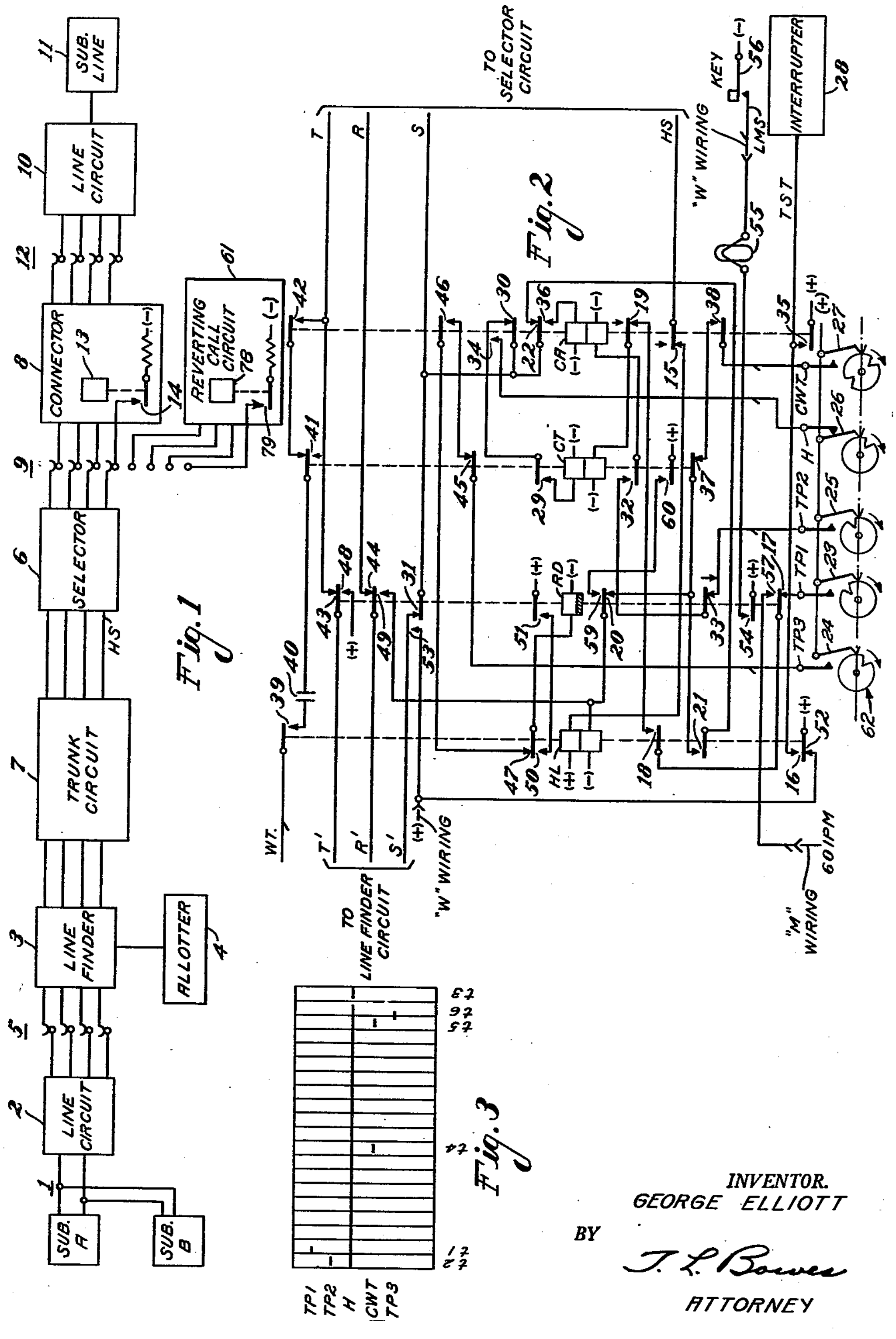

This invention relates to automatic telephone systems and more particularly to conversation timing means for use in automatic telephone circuits.

It is an object of my invention to provide a new and improved conversation timing means using a minimum number of relays.

Another object of my invention is to provide a new and improved conversation timing means for use in automatic telephone systems which permits the holding or the release of preceding equipment after timing out, as may be desired.

It is still another object of my invention to provide new and improved conversation timing means for use on reverting calls.

The foregoing objects of my invention are carried out in a preferred embodiment of my invention by providing a conversation timing trunk or circuit between a finder and a selector, although my conversation timing circuit may be inserted at any desired point in the extension of a call between line finders and connectors.

Within the conversation timing circuit there is provided a control or start relay which operates in response to the answering of a call in order to initiate the timing cycle, the control relay being permitted to release after a predetermined time. The control relay is re-operated at a still later time to apply warning signals to the connection, the control relay being energized only long enough to cause transmission of the warning tone or other signal. At the end of the timing cycle, the control relay is re-operated a third time to hold the connection cut off and conversation locked out. On reverting calls, when lockout is not provided in the line circuits, means is provided for periodically shunting out the transmitter current and short-circuiting the line at such a rate that conversation is unsatisfactory if not impossible.

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Fig. 1 is a block diagram illustrating the principal components of an automatic telephone system employing the principles of my invention, Fig. 2 is a schematic diagram of an embodiment of my invention, and Fig. 3 is a chart useful in understanding the operation of the circuit shown in Fig. 2.

Referring to the drawing there is shown in Fig. 1 a telephone system comprising a calling line 1 which may be a private line or a party line as desired, a party line having subscribers' stations A and B illustrated. Line 1 terminates in a suitable line circuit 2. Means is provided for finding a calling line and may comprise a suitable line finder 3 which may be allotted for the line finding operation by a suitable allotter 4 The line finder may include a suitable step-by-step switch indicated by the numeral 5.

In the illustrated form of my invention, line finder 3 is connected to a suitable selector 6 through a suitable trunk circuit 7 comprising a conversation timing means or circuit. A call extended to selector 6 may be suitably extended to a suitable connector 8 through the agency of a suitable step-by-step switch indicated by the numeral 9 and a call cut through to connector 8 may be further extended to line circuit 10 and subscriber's line 11 as by means of a suitable step-by-step switch 12.

The above-described major components of a system in which my invention finds application may be conventional and suitable circuits which are well known to those skilled in the art. However, suitable circuits for all components except timing means or trunk circuit 7 are illustrated and described in a co-pending application of Frank A. Morris, Serial No. 743,415, filed April 23, 1947, now Patent No. 2,567,650, granted September 11, 1951, and assigned to the same assignee as the present invention.

Referring to connector 8 it is is believed sufficient at this point to indicate that upon the answering of a call extended from calling line 1 to called line 11, a suitable relay 13 is energized to apply resistance battery to supervisory lead HS back through the selector to the conversation timing circuit of trunk circuit 7 through make contacts 14 of relay 13. Where the term "battery" is used herein, the negative terminal of the direct current source is meant, and it is to be understood that the positive source is connected to ground and will hereinafter be referred to as "ground."

For a detailed description of the sequence of operations performed in accordance with my invention, reference is had to Fig. 2. The appearance of battery on the supervisory lead HS causes energization of start relay HL by way of break contacts 15 of relay CA and the upper winding of relay HL.

Operation of relay HL completes a circuit for the timing start lead TST to interrupter 28 through make contacts 16 of relay HL to ground; completes a circuit for operating relay CT from timing pulse conductor TP1 through break contacts 17 of relay RD, make contacts 18 of relay HL and break contacts 19 of relay CA to the lower winding of relay CT (the application of timing pulses to timing pulse lead TP1 is explained later); and locks up to the front sleeve lead through the lower winding of relay HL, break contacts 20 of relay RD, make contacts 21 of relay HL, and break contacts 22 of relay CA. As described in the above-mentioned Morris application, the front sleeve is grounded in the connector 8 when the extended call is cut through to the connector.

There is provided a source of timing pulses and holding ground. Such a source is commonly a suitable time pulse generating means such as a multi-contact interrupter and any desired form may be used. In the schematic arrangement shown in Fig. 2 there are represented a plurality of switches 23, 24, 25, 26 and 27 arranged to be opened or closed, as the case may be, at suitable time intervals. For example, the various switches can be operated by a set of cams 62 mounted on a rotating shaft, the cams being arranged such that switches 23, 24, 25 and 27 are normally opened but are moved to a closed position at certain predetermined times, and switch 26 is normally closed but can be moved to an opened position at a predetermined time. Fig. 3 represents a time chart showing the periods of time when ground is applied to the timing pulse leads TP1, TP2 and TP3, holding ground lead H and warning tone lead CWT. Assuming that the cams for operating the various switches are continuously rotated after the interrupter motor is energized over timing start lead TST, as described above, a pulse of ground potential is applied to lead TP1 through switch 23 when that switch is closed and similarly ground pulses are applied to leads TP2, TP3, and CWT at the times indicated by the horizontal dashes in Fig. 3. Holding ground is applied to holding ground lead H through normally closed switch 26 except during the short interval indicated by the break in the horizontal line opposite the designation H.

Assuming that the interrupter has been started, the first pulse of ground on lead TP1 energizes relay CT through its lower winding over the previously described circuit. Relay CT locks up to the front sleeve lead S through make contacts 29 of relay CT and break contacts 30 of relay CA. Front sleeve lead S is connected to back sleeve lead S′ through break contacts 31 of relay RD.

The operation of relay CT prepares a circuit for energizing changeover relay CA, this circuit extending from the lower winding of relay CA through make contacts 32 of relay CT and break contacts 33 of relay RD to the timing pulse lead TP2. If the time for one complete revolution of the interrupter 28 is two minutes, approximately two minutes after the energization of relay CT, a ground pulse appears on lead TP2 to energize relay CA. Energization of relay CA de-energizes relay HL at break contacts 15 of relay CA; transfers the holding circuit for relay CT from sleeve ground at break contacts 30 to holding ground lead H over a circuit extending from the upper winding of relay CT through make contacts 29 of relay CT and make contacts 34 of relay CA to lead H; connects the timing start lead TST to make contacts 35 of relay CA; locks in relay CA through its upper winding and make contacts 36 of relay CA to sleeve lead S; and prepares a circuit for re-operating relay HL over a circuit extending from the lower winding of relay HL through break contacts 20 of relay RD, break contacts 37 of relay CT and make contacts 38 of relay CA to warning tone lead CWT from the interrupter 28. A predetermined time after the appearance of timing pulse TP2, preferably of the order of two minutes, holding ground lead H is opened for a predetermined period at contact 26 of interrupter 28 and relay CT is de-energized.

A predetermined time after the opening of ground from lead H, preferably about one minute, a pulse appears on lead CWT which re-energizes relay HL. Upon the re-energization of relay HL, a circuit is completed for applying warning tone to the extended circuit between lines 1 and 11 over a circuit extending from a suitable source of warning tone (not shown) over tone lead WT, make contacts 39 of relay HL, capacitor 40, break contacts 41 of relay CT and make contacts 42 of relay CA to the front tip lead T. Warning tone is applied from tip lead T to the back tip lead T′ through break contacts 43 of relay RD. The circuit is completed over the forward ring lead R, back ring lead R′ and break contacts 44 of relay RD. It is noted at this point that relay HL remains energized only during the presence of a warning tone pulse. After another predetermined time interval, as approximately one minute, after the first warning tone pulse, there is applied a second warning tone pulse in the same manner as the first and shortly thereafter a ground pulse is applied over timing pulse lead TP3 to complete a circuit for operating relay RD, the circuit extending from lead TP3 through break contacts 45 of relay CT, make contacts 46 of relay CA and break contacts 47 of relay HL to the winding of relay RD.

At this point, the timing cycle is completed and the operation of relay RD opens the front tip and ring leads T and R to the called station at break contacts 43 and 31, respectively, and thereby disconnects the called loop. The operation of relay RD also disconnects the S′ lead from the S lead at break contact 31, transfers the calling loop to ground through make contacts 48 of relay RD and transfers the back ring lead R′ to the lower winding of relay HL through make contacts 49 of relay RD to again energize relay HL. Upon this second re-energization of relay HL, relay RD is locked in over a circuit extending from the winding of relay RD through make contacts 50 of relay HL and make contacts 51 of relay RD to ground. Relay RD is preferably made slow-to-release to insure the operation of relay HL and the locking up of relay RD. Relay HL in again operating removes at its break contact 52 a substitute ground through make contact 53 of relay RD from the S′ lead so that line finder 3 is caused to release provided W wiring is not used.

When the line finder releases, relay HL is de-energized because of the breaking of the calling loop. In order to prevent allotter 4 from allotting the trunk before the timing circuit is completely released, ground is maintained on the back sleeve lead S′ until relay RD is completely de-energized through break contacts 52 of relay HL and make contacts 53 of relay RD.

If it is desired to hold the preceding equipment after timing out, i. e., if it is desired to hold line circuit 2 and line finder 3, the wiring indicated by W may be utilized. Thus ground is connected directly to the back sleeve lead S′ at make contacts 53 of relay RD and a circuit is provided for testing for lockout of the timing circuit over a circuit extending from ground at make contacts 54 of relay RD, signal lamp 55 and conductor LMS to battery at a suitable testing position through a suitable operating device which may be a key indicated by numeral 56. If the timing circuit has gone to lock out, make contacts 54 of relay RD are closed and operation of key 56 results in the illumination of lamp 55.

Means is also provided for timing the conversation period on reverting calls. If the reverting call timing feature is desired, M and W wiring is employed. Thus, if a call has been made from substation A to substation B over line 1, the operation previously described takes place except that transmission battery over the talking conductors and holding ground over the S lead are returned in the usual manner from reverting call circuit 61 instead of connector 8 and that answering supervision battery is returned by contact 79 of relay 78 in the reverting call circuit instead of by contact 14 of relay 13 in the connector, as previously described. Upon the energization of relay RD a suitable source of intermittent or periodic potential is connected to re-energize the lower winding of relay CT. A suitable source of periodic or intermittent potential may be a source interrupted at 60 impulses per minute, for example, the circuit extending from the lower winding of relay CT through break contacts 19 of relay CA, make contacts 18 of relay HL, and make contacts 57 of relay RD to the 60 I. P. M. lead. Thus relay CT operates at the 60 impulses-per-minute rate. The intermittent operation of relay CT operates to intermittently shunt or ground both sides of the talking loop at the 60 impulses-per-minute rate and no talking currents flow during the shunted periods. The back ring lead R′ is shunted to ground through make contacts 49 of relay RD, make contacts 59 of relay RD and make contacts 60 of relay CT. Back tip lead T′ is connected to ground at make contacts 48 of relay RD.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In an automatic telephone system, a calling line, a called line, means for extending a call from said calling line to said called line, a start relay, means at the called end of said extended call effective upon the answering of said call to close a circuit for energizing said start relay, said start relay being operative in response to the closure of said circuit to initiate conversation timing, time pulse generating means, a source of warning tone, change-over relay means, said relay means being effective under the control of said pulse generating means to release said start relay, prepare a warning tone circuit from said tone source to said lines and place said start relay under the control of said pulse generating means, said start relay being effective upon re-energization under the control of said pulse generating means to complete said warning tone circuit.

2. In an automatic telephone system, a calling line, a called line, means for extending a call from said calling line to said called line, conversation timing apparatus including a relay having two windings, means at the called end of said extended call effective upon the answering of said call to close a circuit for energizing said relay, said relay being operative in response to the closure of said circuit to initiate conversation timing, means for releasing said relay after a predetermined period of time, a source of warning tone, means for temporarily re-energizing said relay after the lapse of an additional period of time, said relay being responsive to said re-energization to transmit warning tone from said source to said lines, and means for thereafter interrupting said extended call and, by way of said relay windings, locking out said calling line and the extending means which precedes said timing apparatus.

3. In an automatic telephone system, a line, first and second subscribers connected to said line, a reverting call circuit for establishing a talking loop between said subscribers, means for extending a call from one of said subscribers to said reverting call circuit, a conversation timing apparatus including a relay, means in said reverting call circuit effective upon the answering of said call to close a circuit for energizing said relay, said relay being operative in response to the closure of said circuit to initiate conversation timing, means for releasing said relay after a predetermined period of time, a source of warning tone, means for temporarily re-energizing said relay after the lapse of an additional period of time, said relay being responsive to said reenergization to transmit warning tone from said source to said line, and means effective after the lapse of a second additional period of time to reoperate said relay in a circuit extending over the calling line and periodically shunt said talking loop, whereby conversation between said subscribers is prevented and said relay prevented from releasing until both said subscribers have disconnected.

4. In an automatic telephone system, a calling line, a called line, means for extending a call from said calling line to said called line, conversation timing means including a relay, means at the called end of said extended call effective upon the answering of said call to close a circuit for energizing said relay, said relay being operative in response to the closure of said circuit to initiate conversation timing, means for releasing said relay after a predetermined period of time, and means effective after the lapse of an additional period of time to re-energize said relay in a circuit extending over the calling line.

5. In an automatic telephone system, a calling line, a called line, means for extending a call from said calling line to said called line, conversation timing appartus including a relay, means at the called end of said extended call effective upon the answering of said call to close a circuit for energizing said relay, said relay being operative in response to the closure of said circuit to initiate conversation timing, means for releasing said relay after a predetermined period of time, a source of warning tone, means for temporarily re-energizing said relay after the lapse of an additional period of time, said relay being responsive to said re-energization to transmit warning tone from said source to said lines, and means effective after the lapse of a second additional period of time to re-energize said relay in a circuit extending over the calling line.

6. In an automatic telephone system, a calling line, a called line, conversation timing apparatus including a relay, a non-numerical switch between said calling line and said conversation timing apparatus, means for extending a call from said calling line through said non-numerical switch to said called line, means at the called end of said extended call effective upon the answering of said call to close a circuit for energizing said relay, said relay being operative in response to the closure of said circuit to initiate conversation timing, said conversation timing apparatus also including means for releasing said relay after a predetermined period of time, and means effective after the lapse of an additional period of time to disconnect said conversation timing apparatus from said called line and to re-energize said relay in a circuit extending over the calling line, said relay being operative upon said re-energization to cause said non-numerical switch to be held as long as the calling condition is maintained on said calling line.

7. In an automatic telephone system, a calling line, a called line, conversation timing apparatus including a relay, a non-numerical switch between said calling line and said conversation timing apparatus, means for extending a call from said calling line through said non-numerical switch to said called line, means at the called end of said extended call effective upon the answering of said call to close a circuit for energizing said relay, said relay being operative in response to the closure of said circuit to initiate conversation timing, said conversation timing apparatus also including means for releasing said relay after a predetermined period of time and relay means effective after the lapse of an additional period of time to disconnect the called end of said extended call from said conversation timing apparatus, close a circuit for holding said non-numerical switch and re-energize said relay in a circuit extending over the calling line, said relay being operative to close a locking circuit for said relay means.

8. An automatic telephone system comprising a calling line, a called line, conversation timing apparatus including first, second and third relay means, a non-numerical switch between said calling line and said conversation timing apparatus, means for extending a call from said calling line through said non-numerical switch to said called line, means at the called end of said extended call effective upon the answering of said call to close a circuit for energizing said first relay means, said first relay means being operative in response to the closure of said circuit to initiate conversation timing, said second relay means being operative to release said first relay means after a predetermined period of time, and said third relay means being operative after the lapse of an additional period of time to disconnect the called end of said extended call from said conversation timing apparatus, close a circuit for holding said non-numerical switch and re-energize said first relay means in a circuit extending over the calling line, said first relay means upon said re-energization being operative to close a locking circuit for said third relay means.

9. An automatic telephone system as claimed in claim 8, characterized in that said first relay means, upon said re-energization, is operative to close a locking circuit for said third relay means and open said holding circuit for the non-numerical switch.

10. In an automatic telephone system, a line, first and second subscribers connected to said line, a reverting call circuit for establishing a talking loop between said subscribers, means for extending a call from one of said subscribers to said reverting call circuit, a conversation timing apparatus including a relay, means in said reverting call circuit effective upon the answering of said call to close a circuit for energizing said relay, said relay being operative in response to the closure of said circuit to initiate conversation timing, means for releasing said relay after a predetermined period of time, and means effective after the lapse of an additional period of time to re-energize said relay in a circuit extending over the calling line and periodically shunt said talking loop, whereby conversation between said subscribers is prevented.

GEORGE ELLIOTT.

REFERENCES CITED

The following references are of record in the file of this patent:

UNITED STATES PATENTS

| Number | Name | Date |
|---|---|---|
| 1,443,451 | Andersen | Jan. 30, 1923 |
| 1,550,815 | Johnson | Aug. 25, 1925 |
| 1,696,275 | Johnson et al. | Dec. 25, 1928 |
| 1,917,384 | Hague | July 11, 1933 |
| 2,232,181 | McClew et al. | Feb. 18, 1941 |